Patented Mar. 26, 1940

2,194,602

UNITED STATES PATENT OFFICE 2,194,602

ACTIVATION OF SILVER CATALYSTS

George H. Law, South Charleston, and Henry C. Chitwood, Charleston, W. Va., assignors to Carbide and Carbon Chemicals Corporation, a corporation of New York No Drawing. Application December 29, 1938, Serial No. 248,209

13 Claims. (Cl. 260—348)

This invention provides improvements in the process of making olefine oxides by the direct catalytic oxidation of olefines by means of molecular oxygen. Specifically, it provides a method for activating catalysts which are initially low in activity or which have lost activity through use.

The process of oxidizing olefines directly to olefine oxides by means of molecular oxygen in the presence of surface catalysts has been described in Reissue Patent 20,370 to T. E. Lefort, dated May 18, 1937. In that patent the use of such surface catalysts as those formed essentially of silver is disclosed. Silver alone, or activated by the addition of small amounts of gold, copper or iron, is a very desirable catalyst for the oxidation of olefins directly to form olefine oxides.

Like many other catalytic surfaces, these silver-containing catalysts are difficult to prepare in an initially highly active form, and when so prepared they suffer a gradual loss in activity as the length of service increases. Ordinarily, catalytic surfaces may be rendered active initially, or after use, by alternative oxidation and reduction, in which the oxidation is accomplished by passing air or oxygen over the heated metal and the reduction of the metal oxide is obtained through contact with hydrogen or other reducing gas. Due to the low dissociation temperature of silver oxide (at atmospheric pressure), it is not possible to oxidize silver easily by air or oxygen. For this reason, special conditions are required for the preparation of silver surface catalysts in those highly active forms desired for the most economical operation of the Lefort process.

In a copending application of G. H. Law, Serial No. 157,883, filed August 7, 1937, a process is described whereby silver surface catalysts suitable for use in the Lefort process may be activated by treating the silver surface with ozone and water vapor at relatively low temperatures, followed by reduction of the silver peroxide formed with hydrogen at higher temperatures. In this process, reduction of the silver peroxide can be replaced by a treatment with a solution of barium, strontium or lithium hydroxide. This latter treatment produces a catalytic material which is of the same general type as that formed of a mixture of silver (or silver oxide) and peroxides of the alkali or alkaline earth metals. Catalysts of this latter type are exceptionally active and desirable for use in the Lefort process, and they form the subject matter of a copending application of R. W. McNamee and C. M. Blair, Serial No. 157,854, filed August 7, 1937.

In the operation of the Lefort process, using either the silver catalysts as disclosed by Lefort or the improved catalysts disclosed in the copending application of McNamee and Blair, higher yields of olefine oxide are obtained by retarding the complete oxidation of the olefine through the addition to the reactants of very small amounts (less than 0.1% by volume) of certain deactivating (or anti-catalytic) materials, or repressants such as ethylene dichloride, xylene, sulfur trioxide and certain other compounds. This improvement is described in our copending application Serial No. 157,884, filed August 7, 1937. However, the addition of such materials does not prolong the activity of the catalyst, and a time may be eventually reached when the catalyst must be reactivated in order to permit continued operation of the process in the most economical fashion.

The principal object of this invention is to provide a convenient, simple and effective method of activating silver surface catalysts for use in the direct oxidation of olefines to olefine oxides. The activation of the catalyst, as disclosed herein, does not require equipment constructed of especially resistant material, such as stainless steel and the like, but may be conducted with complete success in the presence of iron or other conventional materials of construction. The invention also includes the improvements in the process of oxidizing olefines directly to form olefine oxides which are achieved by the use of the new method of activation, all as hereinafter described.

The activation of silver surface catalysts may be accomplished by bringing the catalyst in contact with an aqueous solution of barium, strontium or lithium hydroxide, or a mixture of these, provided, however, that the catalyst has first been treated with a repressant (or anticatalyst) such as ethylene dichloride, chlorine, sulfur chloride, sulfur trioxide, nitrogen dioxide, or other halogen-containing or acid-forming material.

Surface catalysts which contain silver in any physical form can be treated by the process of this invention to effect pronounced increase in, or to restore their original, activity in the Lefort reaction. The extent to which the activity is increased is dependent upon the original form of the silver and the number of times the activation process is repeated. In general, finely divided silver (or silver oxide) having a roughened surface is the preferred form of the catalyst. It is desirable, but not essential, to use a granular inert material, such as porous artificial silica stone, granular ceramically bonded alumina, sandstone and the like, as a support for the finely divided silver. The silver may be deposited on such a support by chemical means, or mechanically from suspensions of finely divided metallic silver or silver oxide. The amount of silver in those catalysts which employ supporting materials may vary over a wide range, but, in general, from about 4% to about 20% by weight is satisfactory.

Although the catalyst may be treated with the repressant or deactivator at any time prior to contact with the barium, strontium or lithium hydroxide solution, the treatment may most advantageously be conducted simultaneously with the oxidation reaction of the olefines, inasmuch as the presence of very small amounts of repressant (less than 0.1%) increases the efficiency of conversion of the olefines to olefine oxides by limiting the formation of carbon dioxide and permitting better heat control of the process, as disclosed in our copending application Serial No. 157,884, mentioned above. However, if just before reactivation the catalyst is further deactivated by treatment with a larger amount of repressant, the resulting activity after treatment with the hydroxide is greater than that attained by employing the hydroxide treatment on the catalyst in a more active condition.

In the following examples, which will serve to illustrate further the nature of the invention, the reaction tubes were one inch iron pipes three feet in length. Each tube was jacketed and wound for electrical heating, and the temperature was regulated by boiling an organic liquid in the jacket. The catalyst sample was placed in the lower part of the tube, and the upper part, or preheating section, was packed with a porous artificial silica stone. A gas mixture containing 10% ethylene and 90% air was passed over the catalyst at a rate of 50 liters per hour. Temperatures were measured within a thermocouple well imbedded in the catalyst or within the boiling liquid in the jacket. Overall yields and efficiencies were calculated from analysis of the exit gases for ethylene oxide, carbon dioxide and unreacted ethylene. By overall yield we mean the ratio of ethylene oxide produced to that theoretically obtainable from the amount of ethylene introduced into the reaction, and by efficiency we mean the ratio of ethylene oxide produced to that theoretically obtainable from the amount of ethylene which has undergone a chemical reaction in the process. Small amounts (less than 0.1% of the total volume) of the repressant were admitted as needed to facilitate control of the reaction. Approximately constant conditions of operation were maintained, and measurements were made at the same temperature before and after deactivation, and after reactivation.

The proportions of the materials are parts by weight.

*Example I*

The catalyst was prepared by heating and stirring vigorously an aqueous mixture of 12.5 parts of freshly precipitated silver oxide and 1.25 parts of barium dioxide with 120 parts of porous silica stone, crushed and sized between 4 and 8 mesh screens. When the water was evaporated, the resulting product was placed in the reaction tube, and the mixture of air and ethylene, with a small amount of ethylene dichloride, was passed over it at a temperature between 295° and 300° C., as measured by a thermocouple within the core. The overall yield gradually decreased with time, and barium hydroxide solution (25% by weight as the octahydrate) was used periodically to restore the activity by allowing it to stand on the catalyst for five minutes at 90° C. In the following table are summarized the data obtained over a total of 1945 hours of operation with three reactivations.

| Elapsed time of operation, hours | Overall yield, percent | Efficiency, percent |
|---|---|---|
| 72 | 39 | 68 |
| 1000 | 9.1 | 39 |

REACTIVATED WITH 25% BARIUM HYDROXIDE

| | | |
|---|---|---|
| 38 | 36 | 64 |
| 94 | 35 | 61 |
| 400 | 15.4 | 41 |

REACTIVATED WITH 25% BARIUM HYDROXIDE

| | | |
|---|---|---|
| 32 | 34 | 57 |
| 98 | 26 | 47 |
| 211 | 15.4 | 47 |

*Example II*

The catalyst was a sample prepared from 90 parts of silver oxide, 9 parts barium dioxide and 260 parts of granular ceramically bonded alumina crushed and graded between 2 and 4 mesh screens. This catalyst had previously been deactivated and used under a number of conditions, so that its activity before the test was abnormally low. The apparatus and method of operation were the same as in Example I, except that an uncored reaction tube was used and the temperatures were measured in the jacket.

The catalyst was intentionally deactivated by introducing an excess amount of ethylene dichloride into the feed gases. The ethylene dichloride (or repressant) is in the feed gases in excess when its presence retards the oxidation of the olefine to olefine oxide more than it retards the oxidation of the olefine to carbon dioxide and water. After running for several hours to test its activity, the catalyst was cooled to 100° C., thoroughly leached with hot water and soaked in a 50% solution of barium hydroxide (octahydrate) at 100° C. for five minutes. After draining, operation was resumed. The following measurements of overall yield and efficiency were made at 280° to 285° C.

| | Overall yield, percent | Efficiency, percent |
|---|---|---|
| Before deactivation | 12.0 | 55 |
| Three hours after deactivation | 00.0 | |
| After reactivation | 17.5 | 35 |

*Example III*

An unpromoted catalyst prepared from 16.5 parts of silver oxide on 300 parts of a 2 to 4 mesh sandstone was used in an uncored tube in the same manner as described under Example II. It was tested and found to possess a moderate initial activity. Ethylene dichloride was admitted in excess and the activity declined until no qualitative test for ethylene oxide in the exit gas could be obtained at 250° C. The catalyst was then treated with 25% barium hydroxide solution for five minutes at 100° C. On resuming operation a 30.5% overall yield of ethylene oxide was obtained at 250° C. with 50% efficiency.

Example IV

A catalyst prepared from 90 parts of silver oxide and 4.5 parts of strontium hydroxide octahydrate promoter, deposited on 260 parts of 2 to 4 mesh granular ceramically bonded alumina was used in an uncored tube. After testing for initial activity it was deactivated by feeding an excess of ethylene dichloride. Reactivation was then conducted by treatment with 10% and with 20% aqueous strontium hydroxide (concentrations calculated as the octahydrate). The catalyst was tested for activity after each operation. All measurements of overall yield and efficiency recorded were made at 215° C. The following results were obtained.

|  | Overall yield, percent | Efficiency, percent |
|---|---|---|
| Before deactivation | 24.5 | 72 |
| After deactivation with ethylene dichloride | 3.2 | 50 |
| After soaking with 10% strontium hydroxide for 10 minutes at 90° C | 4.2 | 56 |
| After soaking with 20% strontium hydroxide for 15 minutes at 95° C | 11.2 | 53 |

Example V

A catalyst prepared from 15 parts of silver oxide and 1.5 parts of barium dioxide promoter, deposited on 180 parts of 4 to 8 mesh porous silica stone was used in a cored tube. After testing for initial activity it was deactivated by feeding an excess of sulfur chloride. Reactivation was then conducted by periodic treatment with 25% aqueous barium hydroxide octahydrate. The following measurements of overall yield and efficiency were made at 295° to 299° C.

|  | Overall yield, percent | Efficiency, percent |
|---|---|---|
| Before deactivation | 39.0 | 61.0 |
| After deactivation | 7.7 | 53.5 |
| 43 hours after reactivation with 25% barium hydroxide at 90° C | 23.5 | 61.7 |
| After a second reactivation with 25% barium hydroxide at 90° C | 33.0 | 55.5 |

Example VI

The catalyst, prepared from 7.5 parts of silver oxide, 0.75 part of barium dioxide and 300 parts of 2 to 4 mesh sandstone, was used in an uncored tube. The apparatus and method of operation were the same as in Example II.

The catalyst was intentionally deactivated by introducing an excess amount of sulfur trioxide into the feed gases. After running for several hours to test its activity, the catalyst was cooled to about 90° C. and soaked for ten minutes in 20% aqueous barium hydroxide octahydrate solution. After draining, operation was resumed. The following measurements of overall yield and efficiency were made at 263° to 264° C.

|  | Overall yield, percent | Efficiency, percent |
|---|---|---|
| Before deactivation | 36 | 57 |
| After deactivation | 0 |  |
| After reactivation | 12.5 | 35 |

About 90% of the original activity of a deactivated catalyst of relatively low silver content can be restored by this method. Catalysts of high silver content which are originally very active at low temperatures are not as completely revivified, somewhat higher temperatures being required after reactivation to attain the original yield and efficiency.

It has been found that successive treatments with barium, strontium or lithium hydroxide become less and less effective, probably due to an accumulation of too much of this material on the catalyst. If, after a number of reactivations, the catalyst is leached with hot water, a greater activity results after the next reactivation.

Other compounds may be used as the repressant, or deactivator, than ethylene dichloride. In general, any compounds which are gaseous in small concentrations between 150° C. and 400° C., and will react with the silver surface of the catalyst to form silver compounds which are converted to silver oxide or hydroxide by the action of barium, strontium or lithium hydroxide, are suitable as the deactivators in this process. For example, acid-forming compounds such as nitrogen dioxide, chlorine, sulfur trioxide, and the like may be used. However, the halogen-bearing organic compounds are more desirable, and the chlorinated ones are preferred.

Variations in the specific procedures shown in the foregoing examples will be apparent and may be adopted without departing from the essentials of this invention. The catalysts activated in accordance with this invention can be used to cause olefines, especially ethylene, to combine directly with molecular oxygen to form the corresponding olefine oxide at temperatures between about 150° and 400° C. Also, as shown by Lefort, the reaction proceeds either at atmospheric pressure or at increased or decreased pressures, and any desired proportion of the olefine and oxygen or air (or other oxygen-containing gas) can be used.

Other modifications of the process will be apparent and are included within the invention as defined by the appended claims.

This application is a continuation-in-part of copending application Serial No. 171,892, filed October 30, 1937.

We claim:

1. Process for activating silver surface catalysts for use in effecting the direct chemical combination of olefines with molecular oxygen to form olefine oxides, which comprises bringing the catalyst in contact with a compound, small concentrations of which are gaseous between 150° C. and 400° C., and which will react with the silver surface of the catalyst to form silver compounds which are converted to silver oxide or hydroxide by the action of barium, strontium or lithium hydroxide, and thereafter treating the catalyst with a member of the group consisting of barium, strontium and lithium hydroxides.

2. Process for activating silver surface catalysts for use in effecting the direct chemical combination of olefines with molecular oxygen to form olefine oxides, which comprises treating the catalyst with a repressant in the gaseous phase, said repressant being chosen from the group consisting of halogenated organic compounds and acid forming compounds, and thereafter treating the catalyst with an aqueous solution of a compound selected from the group consisting of barium, strontium and lithium hydroxides to form an active surface catalyst.

3. Process for activating silver surface catalysts for use in effecting the direct chemical combination of olefines with molecular oxygen to form olefine oxides, which comprises treating the catalyst with a repressant in the gaseous phase, said repressant being a halogenated organic compound, and thereafter treating the catalyst with an aqueous solution of a compound selected from the group consisting of barium, strontium and lithium hydroxides to form an active surface catalyst.

4. Process for activating silver surface catalysts for use in effecting the direct chemical combination of olefines with molecular oxygen to form olefine oxides, which comprises treating the catalyst with a chlorinated organic compound in the gaseous phase at a temperature between 150° and 400° C. and subjecting the thus treated catalyst to the action of an aqueous solution of a compound selected from the group consisting of barium, strontium and lithium hydroxides to form an active surface catalyst.

5. Process for activating silver surface catalysts for use in effecting the direct chemical combination of olefines with molecular oxygen to form olefine oxides, which comprises treating the catalyst with ethylene dichloride and subjecting the thus treated catalyst to the action of an aqueous solution of a compound selected from the group consisting of barium, strontium and lithium hydroxides to form an active surface catalyst.

6. Process for activating silver surface catalysts for use in effecting the direct chemical combination of olefines with molecular oxygen to form olefine oxides, which comprises treating the catalyst with a halogenated organic compound in the gaseous phase at a temperature between 150° and 400° C. and subjecting the thus treated catalyst to the action of an aqueous solution of barium hydroxide to form an active surface catalyst.

7. Process for activating silver surface catalysts for use in effecting the direct chemical combination of olefines with molecular oxygen to form olefine oxides, which comprises treating the catalyst with a chlorinated organic compound in the gaseous phase at a temperature between 150° and 400° C. and subjecting the thus treated catalyst to the action of an aqueous solution of barium hydroxide to form an active surface catalyst.

8. Process for activating silver surface catalysts for use in effecting the direct chemical combination of olefines with molecular oxygen to form olefine oxides, which comprises treating the catalyst with ethylene dichloride at a temperature between 150° and 400° C. and subjecting the thus treated catalyst to the action of an aqueous solution of barium hydroxide to form an active surface catalyst.

9. Process for activating silver surface catalysts for use in effecting the direct chemical combination of olefines with molecular oxygen to form olefine oxides, which comprises treating the catalyst with a halogenated organic compound in the gaseous phase at a temperature between 150° and 400° C. and subjecting the thus treated catalyst to the action of an aqueous solution of strontium hydroxide to form an active surface catalyst.

10. Process for activating silver surface catalysts for use in effecting the direct chemical combination of olefines with molecular oxygen to form olefine oxides, which comprises treating the catalyst with ethylene dichloride at a temperature between 150° and 400° C. and subjecting the thus treated catalyst to the action of an aqueous solution of strontium hydroxide to form an active surface catalyst.

11. Process for activating silver surface catalysts for use in effecting the direct chemical combination of olefines with molecular oxygen to form olefine oxides, which comprises treating the catalyst with a halogenated organic compound in the gaseous phase at a temperature between 150° and 400° C. and subjecting the thus treated catalyst to the action of an aqueous solution of lithium hydroxide to form an active surface catalyst.

12. Process of making ethylene oxide by the direct chemical combination of ethylene with molecular oxygen at temperatures between about 150° and 400° C. in the presence of a surface catalyst, which comprises employing a silver surface catalyst activated by treating the catalytic surface with a chlorinated organic compound in the gaseous phase and thereafter treating the catalyst with a compound selected from the group consisting of barium, strontium and lithium hydroxides to produce an active catalytic surface.

13. Process of making ethylene oxide by the direct chemical combination of ethylene with molecular oxygen at temperatures between about 150° and 400° C. in the presence of a surface catalyst, which comprises employing a silver surface catalyst activated by treating the catalytic surface with ethylene dichloride in the gaseous phase and thereafter treating the catalyst with a compound selected from the group consisting of barium, strontium and lithium hydroxides to produce an active catalytic surface.

GEORGE H. LAW.
HENRY C. CHITWOOD.